United States Patent Office 3,714,827
Patented Feb. 6, 1973

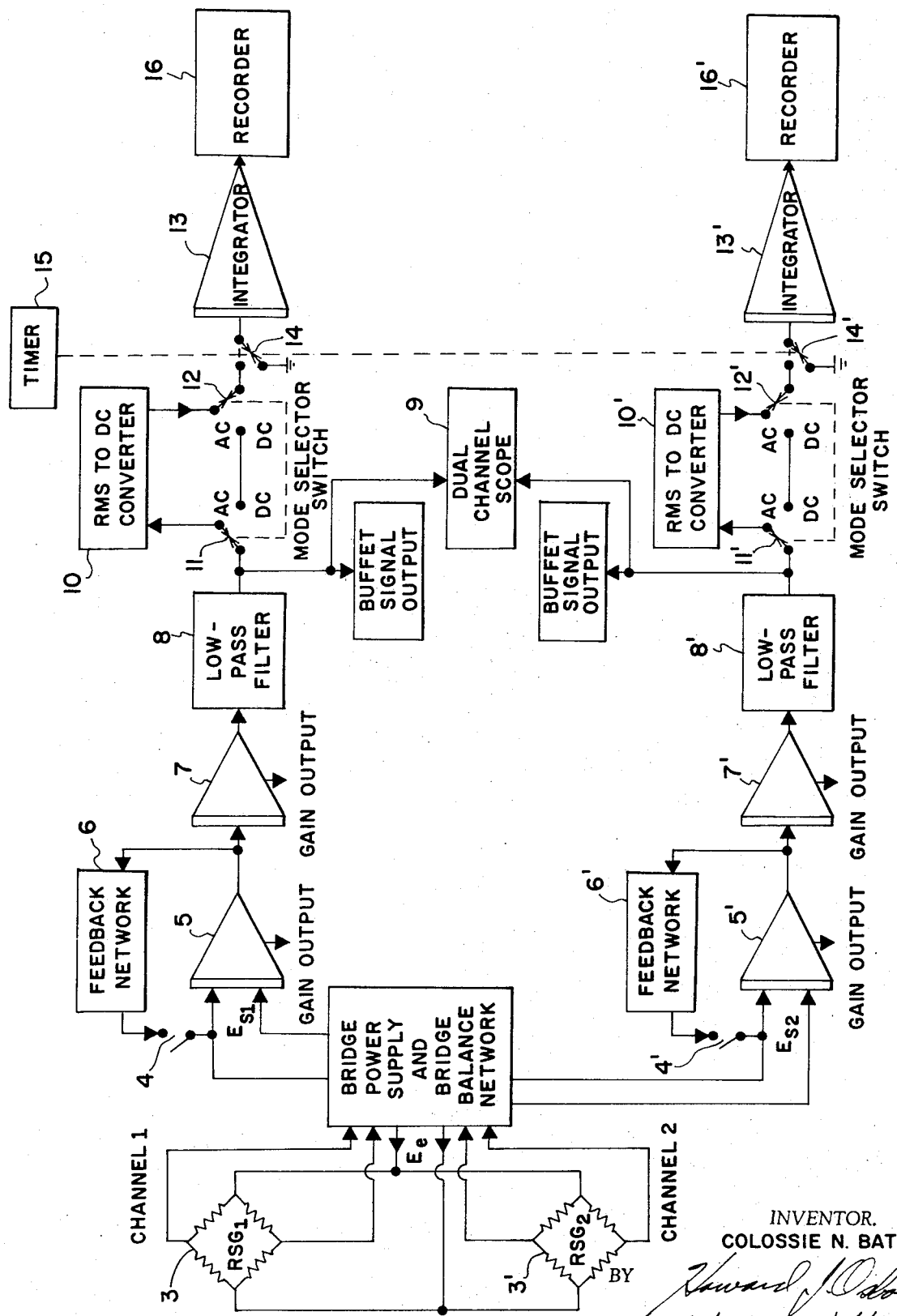

3,714,827
VARIABLE TIME BASE INTEGRATOR CIRCUIT FOR BUFFET SIGNAL MEASUREMENTS
Colossie N. Batts, 17 Berkeley Place,
Newport News, Va. 23602
Filed Nov. 12, 1971, Ser. No. 198,222
Int. Cl. G01m 9/00
U.S. Cl. 73—147                                10 Claims

ABSTRACT OF THE DISCLOSURE

A measurement circuit to obtain buffet data from wind tunnel models wherein a signal proportional to the average RMS value of buffet data is produced for subsequent recording. Feedback means are employed to suppress the D.C. portion of signals developed by the strain gages during dynamic testing. Automatic recording of gain settings of amplifiers employed in the circuit is also provided.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Field of the invention

The present invention relates to a circuit for obtaining measurements of buffet data from wind tunnel models. It has particular utility in the field of designing aerodynamic vehicles.

Description of the prior art

The prior art discloses circuits employing strain gages to obtain data relating to buffet signals. However, such prior art circuits normally estimate the average RMS value of buffet signals by observing fluctuations on an RMS voltmeter to which the buffet signals are applied. Each data point and amplifier gain setting must be manually recorded and plotted. The disadvantages of such prior art devices are:

(1) In many instances large fluctuations in buffet signal amplitudes result in the accumulation of meaningless and useless data.

(2) Changes in the angle of attack associated with aerodynamic vehicles cause large static aerodynamic loads on the vehicle. As a result, the strain gage bridge balance must be adjusted during dynamic testing. In the prior art this operation was accomplished by manually adjusting the bridge balance potentiometer for each change in angle of attack.

(3) Changes in wind tunnel conditions cause variations in buffet signal levels thereby making it necessary to adjust amplifier gain settings during dynamic testing. In the prior art, the gain settings are manually recorded at each data point.

Although certain elements disclosed by applicant are known in the prior art, the circuit comprising applicant's invention is not disclosed therein and is not obvious in view of such prior art. The Holderer Pat. 3,306,101, for example, discloses a strain gage and balance bridge for use in a wind tunnel. Stouffer Pat. 3,401,558 relates to a system which measures an integrated moment due to buffet loads and Bagby Pat. 2,871,698 relates to a data recording system wherein integrated data is obtained to measure air loads acting on the surface areas of an airplane. The Bagby patent particularly discloses that pressure transducers as opposed to strain gages are preferable for use in the device therein described.

SUMMARY OF THE DISCLOSURE

The disadvantages of prior art circuits utilized to obtain buffet signal data are solved by the instant invention which provides for determining the average RMS value of buffet signals by integrating RMS signals developed with strain gages for a preselected time interval. Additional features of the invention include automatic suppression of D.C. voltages from the strain gage bridge output and means for automatically recording amplifier gain settings.

The signals developed by the strain gage are applied to a bridge balance network and, thereafter, to a differential amplifier provided with a feedback network such that the D.C. portion of signals applied from the bridge balance network to the input of the differential amplifier are suppressed. A combination of switches is provided which may be operated such that the circuit may be statically calibrated. During dynamic testing the output of the amplifier combination is applied to an RMS to D.C. converter, the output thereof being selectively connected through switch means and a timer to integrator means which develops a signal proportional to the average RMS value of the buffet data. This signal is then recorded. An oscilloscope is provided to visually reproduce the buffet signals and filter means are utilized to suppress noise resulting from high frequencies.

The following advantages result from the circuit according to the invention:

(1) Integration of the buffet signal eliminates the need for estimating the average RMS value of buffet signals. This increases data accuracy.

(2) The automatic suppression of D.C. voltages resulting from static loads eliminates the possibility of amplifier saturation and the subsequent loss of data. Time is saved by relieving operator personnel from manual bridge balance procedures normally required at each data point.

(3) The automatic recording of amplifier gain settings eliminates human error in reading and recording information. Time is saved by relieving operator personnel of manually recording this information.

(4) The integrated output signal is suitable for recording on devices having only D.C. response.

BRIEF DESCRIPTION OF THE DRAWING

The sole figure in the drawing is an electrical schematic diagram illustrating the circuit according to the invention for obtaining buffet signal measurements.

DETAILED DESCRIPTION OF THE INVENTION

This invention functions to provide buffet information from wind tunnel models. Such information is required in designing aerodynamic vehicles. Buffet arises when flow separation occurs on the surface of an aerodynamic body. The circuit according to the invention determines the average RMS value of buffet signals (also known as bending-moment signals) by integrating RMS signals from strain gages for a preselected time interval.

The figure illustrates the circuit according to the invention. The figure shows channels 1 and 2 for processing two different channels of buffet data and associated gain information. For the purpose of describing the invention, however, only channel 1 will be considered inasmuch as channel 2 functions similarly.

The circuit includes a common D.C. bridge power supply connected to excite strain gage bridges 3 and 3' of channels 1 and 2 respectively by applying excitation voltage Ee thereto. Initially, strain gage bridge 3 is balanced manually by the bridge balance network. The common D.C. bridge power supply and bridge balance network are known in the art and consequently details thereof are not shown in the figure.

The output voltage $E_s1$ of the bridge balance network of channel 1 is connected to the input of differential amplifier 5, which typically would have a gain during dynamic testing in the range of 200 through 1000. The output of the differential amplifier 5 is fed back to the input thereto through negative feedback network 6 which includes a low-pass filter and amplifier combination having an attenuation which typically would be 110 db at 5 Hz. and a gain of 60 db at D.C. The feedback network consequently causes supression of the D.C. portion of bridge output signal $E_s1$ at the input of differential amplifier 5, when switch 4 is activated to the closed position.

The steady state bridge output signal $E_s1$ of channel 1 resulting from static calibration of the circuit is amplified and integrated for a preselected time interval and then recorded as explained hereinafter. During static calibration, switch 4 is activated to the open position to thereby deactivate the D.C. suppression network.

During dynamic testing, the bridge output signal $E_s1$ of channel 1 is amplified by differential amplifier 5 and switch 4 is activated to the closed position to thereby activate the D.C. supression network. The D.C. portion of the amplifier output signal is fed back to the input of differential amplifier 5 and is of opposite polarity to the input thereto, that is, the D.C. portion of the bridge output signal $E_s1$. The two signals thereby effectively cancel each other with the result that the D.C. component of $E_s1$ is attenuated to a few millivolts at the output of the differential amplifier 5. However, the dynamic buffet signals are amplified by differential amplifier 5 and appear at the output thereof.

In many cases buffet signals are of such low amplitude that even the use of a differential amplifier having a gain of 1000 is not sufficient. Therefore amplifier 7, which would typically have a gain of from 1 to 100, is connected to the output of differential amplifier 5 to provide additional gain as required. Low pass filter 8 is connected to the output of amplifier 7 to reduce the effects of system noise resulting from high frequencies. The output of low pass filter 8 is connected during dynamic testing to both dual channel oscilloscope 9 and RMS to D.C. converter 10, and the output of the latter is subsequently integrated and recorded. SPDT switch 11 is interposed between low pass filter 8 and RMS to D.C. converter 10. A similar SPDT switch 12 is interposed between the output of RMS to D.C. converter 10 and integrator 13. Switches 11 and 12 in combination function as a mode selector switch. During dynamic testing, integrate switch 14 is connected to the position shown by the dashed lines such that the output of low pass filter 8 is applied to integrator 13 through RMS to D.C. converter 10. Thus, the output of RMS to D.C. converter 10 is integrated by integrator 13 and recorded by recorder 16.

The timer 15 is common to channels 1 and 2 and functions to activate integrate switches 14 and 14' to the position shown by the dashed lines for a preselected time period, typically from 0 to 120 seconds and thereby determines the integration period during which the output of RMS to D.C. converter 10 is applied to integrator 13. At the end of the preselected integration period, normally about 45 seconds, the mode selector switch is controlled to automatically cause integrate switch 14 to be activated to the grounded position. The integrated buffet data signal appearing at the output of integratory 13 is thus caused to remain at its final level. This signal, which is proportional to the average RMS value of the buffet data, is then applied to recorder 16 to produce a recorded analog representation of the buffet signal data.

A further feature of the circuit of applicant's invention is the provision of coded contacts (not shown) on the gain switch of differential amplifier 5 which permits the gain setting of the differential amplifier to be automatically recorded with the buffet data. A similar arrangement for automatically recording the gain setting of amplifier 7 is also provided. The automatic recording of amplifier gain settings eliminates human error in reading and recording information and also results in a savings in time by relieving operator personnel of manually recording this information.

The circuit according to the invention facilitates deadweight and strain-gage bridge resistance shunt calibrations. In order to perform static calibrations, switch 4 is activated to its open position and the mode selector switch is activated to the D.C. position. This deactivates the differential amplifier feedback network 6 and causes the static calibration signal to bypass the RMS to D.C. converter 10.

After wind-tunnel installation of each test model, a deadweight calibration is made prior to buffet testing. Initial balance of the starin-gage bridge is obtained manually by using the bridge balance potentiometer. Following initial balance, a deadweight load is suspended from the model at a selected point to induce a bending moment which is sensed by the strain-gage bridge. As the deadweight load is changed, the resultant bridge D.C. output signal is amplified and integrated for a preselected time interval and then recorded. This type calibration may be used to determine buffet intensity on test models which are elastically and dynamically scaled. Deadweight calibration is also useful in connection with subsequent frequency analysis of buffet data recorded on magnetic tape.

The circuit according to the invention therefore provides for:

(1) amplifying and integrating deadweight calibration signals;

(2) amplifying, converting (RMS to D.C.), and integrating buffet signals;

(3) automatically suppressing D.C. voltages caused by static loads on the model during tests; and (4) automatically recording amplifier gain settings.

Angle-of-attack changes during buffet tests cause large static aerodynamic loads on the model which result in D.C. output signals from the resistance strain-gage bridge. The level of D.C. signals may be several orders of magnitude greater than the dynamic buffet signals being measured. To insure that the system data amplifiers not be saturated as a result of static loading, the D.C. output signal from a strain-gage bridge must be nulled each time the angle of attack is changed. This operation was previously accomplished by manually adjusting the bridge balance potentiometer for each change in angle of attack. The inadvertent omission of this adjustment could cause data amplifier saturation and the subsequent loss of data. The subject system provides automatic suppression of any D.C. voltages resulting from static loads, thereby eliminating the need for manual adjustment during tests.

Changes in wind-tunnel conditions such as Mach number, dynamic pressure, and angle of attack result in large variations of buffet signal levels. To compensate for these variations, system gain settings were formerly adjusted and recorded manually during tests. This system automatically records gain settings to eliminate the possibility of recording erroneous gain information due to human error.

It should also be understood that the circuit according to the invention described herein is applicable for measuring the average RMS value of other transient data originating from low electrical impedance sources, that is impedance sources up to approximately 1000 ohms. The upper frequency limit realizable is dependent upon the frequency response of the amplifiers.

What is claimed is:

1. A measurement system to obtain the average RMS value of transient data comprising:

first means to derive electrical signals representative of the transient data, first amplifier means connected to said first means to amplify said derived electrical signals, the first amplifier means having a D.C. suppression network selectively actuable to suppress the D.C. portion of derived electrical signals applied to the input of the first amplifier means, a RMS to D.C. converter, integrator means, and mode selector means selectively actuable to first and second positions, actuation of the mode selector means to the first position causing the output of the first amplifier means to be connected through the RMS to D.C. converter to the input of the integrator means to produce an output signal from the integrator means which is proportional to the average RMS value of the transient data.

2. The measurement system as recited in claim 1 further comprising:

recording means connected to the output of the integrator means to produce a recorded analog representation of the transient data.

3. The measurement system as recited in claim 2 wherein the first amplifier means has a plurality of gain settings and means to produce an indication of a given gain setting for automatic recording by the recording means.

4. The measurement system as recited in claim 2 wherein actuation of the mode selector means to the second position causes the output of the first amplifier means to be connected to the integrator means.

5. The measurement circuit as recited in claim 4 further comprising:

integrate switch means having open and closed positions connected between the mode selector means and the integrator means, timer means connected to the integrate switch means to control the latter such that the integrate switch means is maintained in its closed position for a preselected period of time determined by the setting of the timer means to thereby determine the integration time period of the integration means.

6. The measurement system as recited in claim 5 further comprising:

second amplifier means interposed between the first amplifier means and the mode selector means, the second amplifier means having a plurality of gain settings and means to produce an indication of a given gain setting for automatic recording by the recording means.

7. The measurement system as recited in claim 6 further comprising:

low pass filter means interposed between the second amplifier means and the mode selector means to prevent high frequency noise components from being applied to the integrator means.

8. The measurement system as recited in claim 7 wherein the first means comprises:

a strain gage bridge having an associated bridge power supply and bridge balance network to derive transient data in the form of buffet data from wind tunnel models.

9. The measurement system as recited in claim 1 wherein the first amplifier means comprises a differential amplifier having a feedback network selectively actuable to feed back a signal to the input of the differential amplifier to effectively cancel out the D.C. portion of derived electrical signals to provide for automatic D.C. suppression during dynamic testing.

10. The measurement system as recited in claim 1 wherein the first means comprises:

a strain gage bridge having an associated bridge power supply and bridge balance network to derive transient data in the form of buffet data from wind tunnel models.

References Cited

UNITED STATES PATENTS

| | | | |
|---|---|---|---|
| 3,391,571 | 7/1968 | Johanson | 73—67 |
| 3,401,558 | 9/1968 | Stouffer | 73—147 |
| 3,555,894 | 1/1967 | Bratowski | 73—71.4 |

S. CLEMENT SWISHER, Primary Examiner